Figure 2:
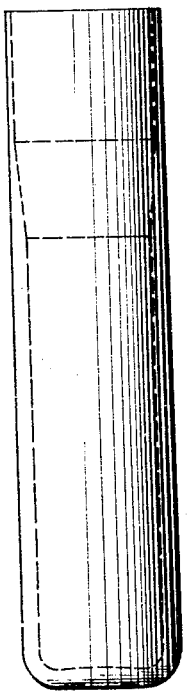

March 30, 1943.   F. A. PARKHURST   2,315,478
METHOD OF PRODUCING PLASTIC CONTAINERS
Filed Sept. 16, 1938   2 Sheets-Sheet 1
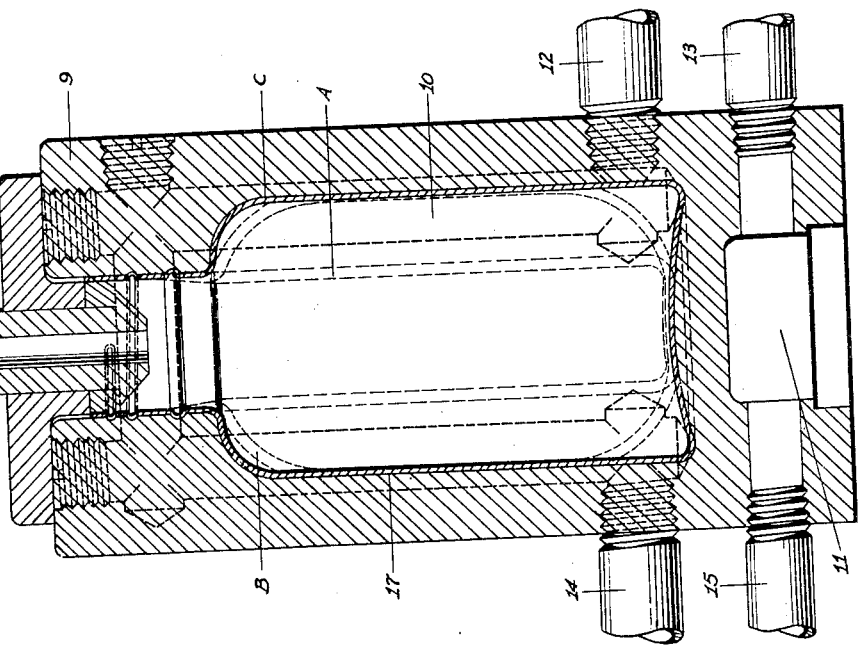
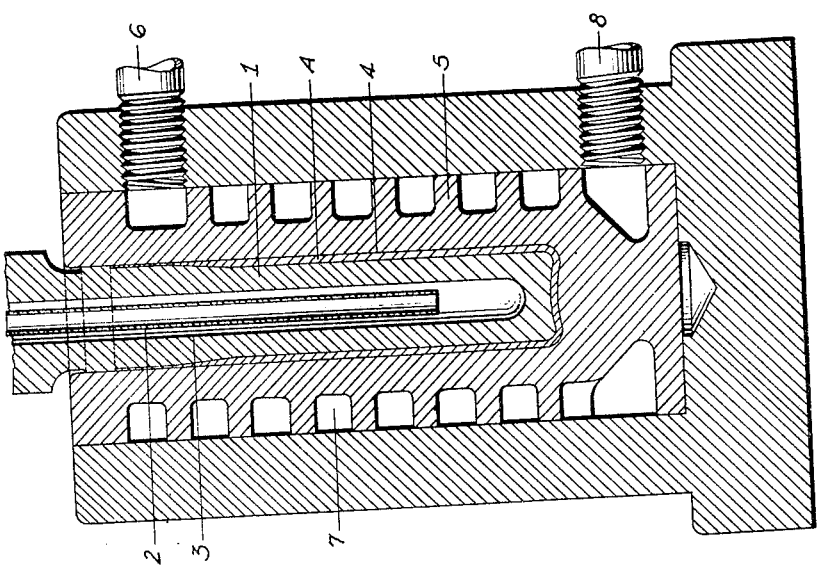
Inventor
FREDERIC A. PARKHURST.
By Gerald H. Peterson
Attorney March 30, 1943.　　　F. A. PARKHURST　　　2,315,478
METHOD OF PRODUCING PLASTIC CONTAINERS
Filed Sept. 16, 1938　　　2 Sheets-Sheet 2

INVENTOR
Frederic A. Parkhurst
BY
Alan M. Mann
his ATTORNEY

Patented Mar. 30, 1943

2,315,478

UNITED STATES PATENT OFFICE 2,315,478

METHOD OF PRODUCING PLASTIC CONTAINERS

Frederic A. Parkhurst, Suffield, Conn., assignor to Monsanto Chemical Company, a corporation of Delaware Application September 16, 1938, Serial No. 230,223

5 Claims. (Cl. 18—55)

This invention relates to containers made of plastic material having a restricted portion such as a neck, and an enlarged portion beyond or below the restricted portion. The particular shape has nothing to do with my present invention except as it creates a problem. Containers having no part of larger diameter than the mouth can easily be made by known methods such as pressure molding, but when there is an enlarged portion of greater internal diameter than a portion nearer to the open end, pressure molding is not applicable.

The materials to be employed for this purpose are any of the non-brittle heat softening organic plastics, such for example as cellulose esters, particularly the acetate, or vinyl type resins such as vinyl acetals or styrenes or acrylates. Actually the chemical nature of the plastic material is not of so much consequence (so long as it is inert to the substance for which the container is to be used) and any of the organic plastics can be employed which soften with heat and are not too brittle when cold.

The problem of making containers from this type of material is not a new one, but the results heretofore have not been commercially acceptable. The processes employed have usually involved the steps of forming a tube or cylinder by dipping a mandrel in a solution and driving off solvent to form a cylinder, and then warming the cylinder and blowing it up in a mold. This idea is a very old one but it has not produced satisfactory results.

I have found that this problem can be solved if certain novel steps are employed and the proper conditions maintained; and when these are correctly employed, I obtain containers of excellent character adapted to many industrial uses.

An important feature of my process relates to the manufacture of the blank, or as I prefer to call it, the "preform" from which the container is to be made. Instead of manufacturing this by a dipping or extrusion process, I make the preform in a pressure mold which enables me to give it certain characteristics that are essential to success. Pressing in itself gives a better product than dipping, perhaps because there is no effect due to solvent elimination, but much more important is the fact that by pressing the preform I am able to form the walls of varying thicknesses, which I believe is the essential factor necessary to make the subsequent blowing a success.

For the sake of simplicity and economy, it is highly desirable to use a simple cavity type mold combined with a plunger. Two-piece cavity molds cause many difficulties and do not so easily lend themselves to the use of molds with a large number of cavities.

Using a simple cavity and plunger mold, it is necessary that the plunger shall draw from the preform and that the preform shall draw from mold. Even with these limitations, the necessary conditions can almost always be met, since a side wall which increases in thickness from the mouth or open end downward can be formed by increasing the taper of the plunger either gradually or abruptly, and in the same way a reduction in thickness of the side walls towards the base can be taken care of on the outside of the preform by varying the taper of the mold cavity.

After the preform is shaped, it is preferably warmed to approximately its softening point and then put into a heated die having a cavity of the desired contour which grips the mouth or open end of the preform. Air (which may be heated), or other fluid such as steam, is then introduced under pressure and the preform is expanded to fill the die.

If one expands an ordinary elastic body (such as a toy balloon) in the open air, attempts to thicken the points where maximum expansion is desired have exactly the opposite effect, for maximum expansion takes place at the thinnest points. In the case of my process, this difficulty does not arise and I believe that this is due to the fact that when blowing up the preform, the air pressure is increased progressively so that the walls of the preform undergo a progressive movement or flow. Of course, when the pressure is first applied, the tendency of the walls is to assume a spherical shape; but almost immediately the walls will begin to contact the sides of the die cavity. Since the cavity is heated, the thermoplastic material will soften where it contacts and being softer will tend to thin out under the action of the air pressure. As a result, in some shapes, as for example in the case of a usual type of bottle, I find that the corners which probably are the last to fill out, instead of being the thinnest due to the greatest stretching, are thicker than the middle of the side walls where one would presume that but little movement had taken place. As stated, this effect is probably due to a progressive increase in air pressure but this may in some case be quite rapid as for example reaching a maximum in the course of about one second, whereas with shapes demanding a relatively large expansion, a much slower and more gradual increase may be necessary.

Figure 4:
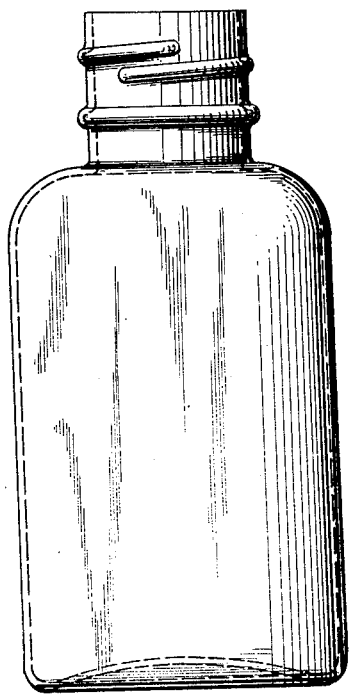
Figure 5:
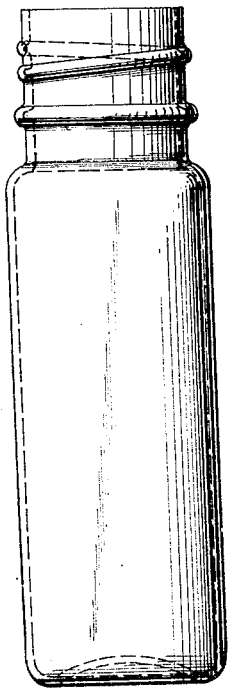

For the sake of illustration, I will describe my process in connection with the accompanying drawing, in which Fig. 1 shows an apparatus for and illustrates the process steps of molding a preform; Fig. 2 is a side view of a preform; Fig. 3 shows an apparatus for and illustrates the process of blowing a bottle from a preform; Fig. 4 is a side view of a bottle; and Fig. 5 is a side view of a bottle taken at right angles to Fig. 4.

The bottle here illustrated was 3¾ inches high and 1¾ inches wide by 1 1/16 inches thick. It was desired that the side walls should have an average thickness of .025 inch.

A cavity mold and plunger, circular in cross-section were prepared to make the preform as shown in Fig. 1. The mold for forming the preform A may comprise a plunger 1, which may be heated by circulating a heating medium, such as steam, through pipe 2 and passage 3 and a mold cavity 4 formed by casing 5, which may be heated by circulating a heating medium, such as steam, through pipe 6, spiral heating coil 7, and pipe 8. It will be noted that the plunger 1 is so shaped that in this case there is a substantial increase in the thickness of the side walls of the preform A which begins near or slightly above the point where the shoulders of the bottle are later to be expanded out. Since in this case the size of the bottle was to be uniform from the shoulders down to the bottom, no abrupt taper was necessary in the mold cavity 4 such as might be used where the final article is of smaller size at the bottom. Here the neck portion had a wall thickness of about .0275 inch, where the walls of the main body portion and base were .075 inch thick. The preform tapered on the outside slightly towards the closed end so that it was easily knocked from the mold.

The volume and weight of this preform was computed and the proper amount of a standard flexible type cellulose acetate molding compound was introduced into the mold and molded in the usual way by heating and pressing and then cooling. The preform was warmed up and then inserted in a two-piece blowing die of the desired contour, which gripped the neck of the preform as shown in Fig. 3. The die 9 was heated with steam in a usual manner for example, by circulating a heating medium, such as steam, or oil, through heating pipes 10 and 11 having inlet connections 12 and 13 and outlet connections 14 and 15, respectively, and air pressure admitted through inlet 16. As the air was admitted the preform A expanded against the walls 17 of the die in a manner similar to that shown in dotted lines at B, and continued to expand until the organic thermoplastic material was pressed against the entire walls 17 of the die, as shown in the full lines C. In this case a pressure of about 60 pounds per square inch was built up over the course of about one minute or somewhat less. The die was then cooled and opened and a satisfactory bottle was obtained, as illustrated in Figs. 4 and 5.

In another case a shape was made of approximately uniform internal diameter but with raised relief ornamentation around the top. Here the preform was made with a band of thickening on the outside produced by a taper in the mold cavity expanding from the bottom up. The steps of operation were carried out as above except that as the amount of blowing was slight, the air pressure was increased much more rapidly, being permitted to reach a maximum in about one second.

It is understood that these examples are given only by way of illustration and may be modified in many particulars.

What I claim is:

1. A method of forming a hollow article having an open end, an enlarged portion and a restricted portion between the open end and enlarged portion from an organic thermoplastic material which comprises molding a preform of said article from said organic thermoplastic material, said preform having walls of varying thickness, the thickness being greater at the zones of greatest subsequent expansion, placing said preform in a die, internally subjecting said preform to fluid pressure while in said die and simultaneously applying heat externally to said preform to heat it to a temperature sufficiently high to soften the organic thermoplastic material thereof so that it will tend to thin out under the action of said fluid pressure and expand against the walls of said die, and cooling the expanded preform to set the organic thermoplastic material.

2. A method of forming a hollow container having an open end, an enlarged portion and a restricted portion between the open end and enlarged portion from a non-brittle organic thermoplastic material which comprises molding a preform of said container from said non-brittle organic thermoplastic material, said preform having walls of varying thickness, the thickness being greater at the zones of greatest subsequent expansion placing said preform in a die, internally subjecting said preform to fluid pressure while in said die and simultaneously heating said die and thereby applying heat externally to said preform while being subjected to said fluid pressure to heat said preform to a temperature sufficiently high to soften the material thereof so that it will tend to thin out under the action of said fluid pressure and expand against the walls of said die, and cooling the expanded preform to set the non-brittle organic thermoplastic material.

3. A method of forming a hollow article having an open end, an enlarged portion and a restricted portion between the open end and enlarged portion from an organic thermoplastic material which comprises molding a preform of said article from said organic thermoplastic material, said preform having one dimension substantially that of the finished article and in the form of an open-mouthed vessel tapering on the inside to a reduced inside diameter towards the closed end and having walls of varying thickness, the thickness being greater at the zones of greatest subsequent expansion, placing said preform in a die, internally subjecting said preform to fluid pressure while in said die and simultaneously heating said die and thereby applying heat externally to said preform to heat to a temperature sufficiently high to soften the organic thermoplastic material thereof and to heat the portions of said preform which on expansion of the preform under said fluid pressure contact the walls of the die so as to cause thermoplastic material to flow progressively from the zone of first contact with said die to zones removed from immediate contact therewith and thus to cause the preform to undergo greater expansion at zones of greater thickness, so that the material of said preform will tend to thin out under the action of said fluid pressure and expand against the walls of said die, and cooling the expanded preform to set the organic thermoplastic material.

4. A method of forming a hollow article having an open end, an enlarged portion and a restricted portion between the open end and enlarged portion from an organic thermoplastic material which comprises molding a preform of said article from said organic thermoplastic material, said preform having walls of varying thickness, the thickness being greater at the zones of greatest subsequent expansion, placing said preform in a die, applying heat externally to said preform to heat it to a temperature sufficiently high to soften the organic thermoplastic material thereof, and simultaneously subjecting said preform internally to fluid pressure while in said die and thereby expanding said preform against the walls of said die, and cooling the expanded preform to set the organic thermoplastic material.

5. In a method of forming a hollow article, having an open end, an enlarged portion and a restricted portion between the open end and the enlarged portion, from an organic thermoplastic material, the steps which comprise placing a preform of said article in a die, said preform being formed of said organic thermoplastic material and having walls of varying thickness, the thickness being greater at the zones of greatest subsequent expansion, and while said preform is in said die, heating said preform externally to a temperature sufficiently high to soften the organic thermoplastic material thereof and during the time of said heating subjecting said preform internally to fluid pressure while in said die, thereby expanding said preform against the internal wall of said die to form said hollow article.

FREDERIC A. PARKHURST.